US009589698B2

(12) United States Patent
Anhalt et al.

(10) Patent No.: US 9,589,698 B2
(45) Date of Patent: Mar. 7, 2017

(54) CONDUCTIVE POLYMER MATERIAL, USE OF SAME, AND A METHOD FOR THE PRODUCTION OF SAME (75) Inventors: Klaus-Peter Anhalt, Rhumspringe (DE); Holger Reinhardt, Kempen (DE)

(73) Assignee: Otto Bock HealthCare GmbH, Duderstadt (DE)

( * ) Notice: Subject to any disclaimer, the term of this patent is extended or adjusted under 35 U.S.C. 154(b) by 517 days.

(21) Appl. No.: 14/117,084

(22) PCT Filed: May 11, 2012

(86) PCT No.: PCT/DE2012/000517
§ 371 (c)(1),
(2), (4) Date: May 22, 2014

(87) PCT Pub. No.: WO2012/152262
PCT Pub. Date: Nov. 15, 2012

(65) Prior Publication Data
US 2014/0246628 A1    Sep. 4, 2014

(30) Foreign Application Priority Data
May 12, 2011   (DE) .................. 10 2011 101 579

(51) Int. Cl.
*H01B 1/22*   (2006.01)
*A01B 1/00*   (2006.01)
(Continued)

(52) U.S. Cl.
CPC .................. *H01B 1/22* (2013.01); *C08K 7/00* (2013.01); *C08K 7/16* (2013.01); *C09C 1/0021* (2013.01);
(Continued)

(58) Field of Classification Search
CPC ..... H01B 1/00; H01B 1/20; H01B 1/22; C09J 9/02; C09J 4/00; A61B 5/04087; A61L 24/001
See application file for complete search history.

(56) References Cited

U.S. PATENT DOCUMENTS 5,137,959 A     8/1992  Block et al.
5,400,782 A *   3/1995  Beaubiah ............. A61B 5/0408
                                                           600/394
(Continued)

FOREIGN PATENT DOCUMENTS

DE      16 65 098 A1    1/1971
DE      30 08 264 A1    9/1981
(Continued)

OTHER PUBLICATIONS

"Silicones", Ullmann'S Encyclopedia of Industrial Chemistry, 1993, pp. 57-81, vol. A24.
(Continued)

*Primary Examiner* — Mark Kopec
(74) *Attorney, Agent, or Firm* — Whitham, Curtis & Cook, P.C.

(57) ABSTRACT

The invention relates to a conductive elastomer provided and formed from a base elastomer and conductive solid particles that are distributed therein. The conductive particles used are: a) platelet-shaped conductive particles and/or b) dendritic conductive particles and/or c) other elongated conductive particles with a length:width ratio of greater than or equal to two. It has been seen that a combination of ball-shaped and platelet-shaped conductive particles is particularly advantageous. The particles can additionally be aligned by the pouring, application using a doctor blade, or drawing of the dissolved or not-yet cured mixture. The polymer is particularly suitable for medical electrodes for (Continued)

conductive filler, mixed spherical - plate-shaped
(1000-fold enlargement)

capturing and emitting signals. The material rennulus elastic, and conductive when stretched or bent.

20 Claims, 4 Drawing Sheets

(51) Int. Cl.
    *C08K 7/00*     (2006.01)
    *C08K 7/16*     (2006.01)
    *H01B 1/20*     (2006.01)
    *C09C 1/62*     (2006.01)
    *C09C 1/00*     (2006.01)

(52) U.S. Cl.
    CPC ............... *C09C 1/62* (2013.01); *H01B 1/20* (2013.01); *C01P 2004/20* (2013.01); *C01P 2004/54* (2013.01); *C01P 2004/61* (2013.01); *C01P 2006/40* (2013.01); *C08K 2201/001* (2013.01); *C09C 2200/102* (2013.01); *C09C 2200/1004* (2013.01)

(56) References Cited

U.S. PATENT DOCUMENTS

| | | | |
|---|---|---|---|
| 5,565,143 A * | 10/1996 | Chan | H01B 1/22 252/514 |
| 2004/0106718 A1 | 6/2004 | Krohn | |
| 2005/0096574 A1 * | 5/2005 | Wibaux | A61F 13/02 602/2 |
| 2008/0121848 A1 | 5/2008 | Nobbs | |
| 2013/0092881 A1 * | 4/2013 | Burnham | H01B 1/24 252/511 |

FOREIGN PATENT DOCUMENTS

| | | |
|---|---|---|
| DE | 44 15 802 A1 | 11/1995 |
| DE | 196 51 166 A1 | 12/1996 |
| DE | 198 51 166 A1 | 5/2000 |
| DE | 10 2005 041 297 A1 | 3/2007 |
| DE | 10 2008 050 932 A1 | 4/2010 |
| DE | 10 2008 050932 A1 | 4/2010 |
| DE | 10 2009 013 470 A1 | 10/2010 |
| EP | 57838 A1 | 8/1982 |
| EP | 0 139 557 A1 | 5/1985 |
| EP | 0 359 569 A2 | 3/1990 |
| EP | 511570 A1 | 11/1992 |
| JP | 2008179834 A | 8/2008 |

OTHER PUBLICATIONS

"Polyurethanes", Ullmann's Encyclopedia of Industrial Chemistry, 1993, pp. 702-703, vol. A21.
Oertel, "Thermoplastic Polyurethane", Polyurethane Handbook, 1993, pp. 421-433.
"Week 197748", Database WPI, Oct. 18, 1977, Thomson Scientific, London, GB.
Pfaff, "Funktionelle anorganische Pigmente", Jul. 2003, Web.

* cited by examiner

Figure 2: spherical metal particles in polymer (3000-fold enlargement)

Figure 1: spherical metal particles in polymer (250-fold enlargement)

Figure 3: conductive filler, mixed spherical - plate-shaped (1000-fold enlargement)

Figure 4: ordered

Figure 5: unordered

CONDUCTIVE POLYMER MATERIAL, USE OF SAME, AND A METHOD FOR THE PRODUCTION OF SAME

The invention relates to a conductive polymer material made of a base polymer and conductive solid particles distributed therein, the use of this material, in particular in the medical and orthopedic technology fields, a skin overlay containing the material, and a method for the production thereof.

Electrically conductive polymers are required in greatly varying fields of technology. Inter alma, in the medical and orthopedic technology fields, conductive polymers are readily used instead of rigid metallic conductors, if potentials are to be discharged from the body of a patient or potentials are to be applied electrically to specific body regions. This is performed there above all to promote better wearing comfort, i.e., to avoid direct contact with metallic conductors on the human body. Frequently, it is simultaneously sought for the plastic to equalize potential peaks and average voltage values uniformly over a specific local region.

A large field of application for conductive polymers is therefore medical electrodes, which are designed for direct body contact, for signal acquisition, signal generation, and stimulation including sensors. In addition, these materials can be used, for example, for flexible conductor paths and other electrical components.

Conventional electrodes for everyday clinical use, as disclosed in DE 10 2009 013 470 A1, are frequently based on Ag/AgCl electrodes and require electrolytic gels or pastes between the sensor and the skin to reduce the transfer impedance. The gels dry out over time, which results in a dramatic decrease of the signal quality. Many persons are sensitive or even allergic to the gel substances used, so that these gels are also to be avoided for this reason.

Conductive textiles are also known, in which polymers, specifically elastic synthetic threads, are partially also used. DE 10 2005 041 297 A1 discloses an electrically conductive, elastically extensible hybrid thread having an elastic core and an electrically conductive carbon fiber jacket. A textile obtained therefrom is provided for shielding purposes and surface heating elements. For medical applications, such textiles are excessively inhomogeneous and not sufficiently reproducible with respect to the electrical conductivity. This textile additionally has relatively poor contact with the skin, which only occurs at points.

The invention is based on the object of providing a conductive polymer material—in particular for electrodes and sensors for medicine, sports medicine, and orthopedic technology—which is producible without problems, remains conductive in the event of bending or stretching, is not black and therefore can be dyed, remains stable under usage conditions when it is worn on the body, even in a damp milieu, and is easy-care. The mechanical properties of the base polymer are to remain as uninfluenced as possible. The conductive polymer is also to be adaptive or supple in such a manner that a high wearing comfort is ensured.

The object is achieved by the conductive polymer material according to claim 1.

The conductive polymer material consists of a base polymer, which is itself not conductive or not substantially conductive, and which can optionally be provided with additives and aggregates, and conductive solid particles finely distributed therein, which are substantially homogeneously dispersed in the volume of the conductive polymer material. In this way, a conductive polymer material which is homogeneous per se results, which can be used, inter alia, for electrodes and sensors.

The base polymer can be a homopolymer or copolymer or a mixture of polymers. The term "polymer" is to be understood in a technical sense; inter alia, polycondensates are therefore also considered to be polymers.

The conductivity of the polymer material according to the invention is caused by conductive solid particles embedded in the polymer, as is known per se. The conductivity is such that it extends as a property to the entire material or volume, respectively, and goes beyond simple surface conductivity or antistatic finishing. In the meaning of the invention, "conductive" means having a specific resistance ($\rho_{D,S}$) of preferably not greater than 1000 k$\Omega$·cm, more preferably not greater than 100 k$\Omega$·cm.

For polymers which are conductive or antistatic to a limited extent, carbon black is frequently used as a conductivity additive. The materials obtained are black, cannot be dyed, and are therefore relatively unattractive for medical applications. Conductivity carbon black consists of nanoparticles, which may be incorporated very poorly in polymer melts or viscous polymer solutions. The viscosity of the mixture would increase during the incorporation of the conductive carbon black quantity required for the desired conductivity so strongly that the processing of the polymer material would be made extremely difficult, if not impossible. Furthermore, carbon black in contact with the skin is to be avoided for health reasons, inter alia, because of unavoidable polyaromatic hydrocarbon contents.

The following conductive solid particles are embedded in the base polymer and distributed over its volume according to the invention:

a) plate-shaped conductive particles and/or
b) dendritic conductive particles and/or
c) other oblong conductive particles having a ratio of length to width greater than or equal to 2.

These are particles in the micrometer scale (with respect to at least one spatial direction) and not nanoparticles. This causes a substantially improved processing ability of the mixture to form the elastic and/or flexible polymers according to this invention.

The quantity of the conductive particles is set such that the desired conductivity results. Filling contents up to 35 vol-%, preferably up to 30 vol-%, more preferably up to 18 vol-% maximum content of conductive particles are implementable, without the material becoming excessively brittle.

Conductive plate-shaped pigments, in particular coated mica pigments, can be used as plate-shaped conductive particles. Such pigments are known, for example, as special effect paints simultaneously having an antistatic effect. They are used for lacquers and other surface coatings. Inter alia, layered silicates, in particular mica and further plate-shaped nonmetal oxides, such as silicon dioxide, titanium dioxide, or also barium sulfate, are used as carrier materials for this group of conductive particles. In general, the plate main body is formed from an inorganic-oxidic carrier material or from metal. These carrier materials are coated using a conductive layer, if necessary, which can be formed from doped metal oxides, for example, antimony-doped zinc oxide. An example of a mica pigment which is made conductive using antimony-doped tin oxide is described in EP 0 139 557, to which reference is hereby made. The plate main bodies can alternatively also be metallically coated, for example, vapor deposited.

"Plate-shaped particles" are generally understood as those the height of which is substantially uniform and significantly less than the width and/or length thereof. Typically, plate-shaped particles suitable for the invention can have a length along the main axis of 1 µm to approximately 60 µm, preferably between approximately 5 µm and 30 µm. The height in relation thereto is preferably between 100 nm and 1 µm, preferably approximately 500 nm. In addition, it is preferable for the ratio of the main axis to at least one of the orthogonal secondary axes of the plate-shaped, dendritic, or other oblong conductive particles to be between 1.5:1 and 10:1.

A base polymer which is admixed with plate-shaped or oblong conductive particles generally has a higher basic conductivity than a base polymer filled with the same weight fraction of corresponding spherical conductive particles. This means that the percolation threshold is lowered by the flat and preferably elongated shape. By way of the invention, it is possible to produce conductive, flexible, and elastic polymers which more or less do not lose their flexibility and rubber-like elasticity, while the same base polymers, in the event of filling with powdered or spherical conductive particles with corresponding conductivity values, if conductivity would be achieved at all using spherical particles, would be affected by greatly reduced flexibility and/or extensibility, poor elongation at tear values, and a high tendency toward tear propagation. Spherical or powdered particles (possibly also in nanoscale) would have to be introduced in such a high weight fraction to achieve a sufficient conductivity that the density of the material would increase significantly—a disadvantage for the otherwise preferably light polymer, material.

Surprisingly, a conductive polymer which contains plate-shaped or oblong conductive particles fundamentally maintains its conductivity also in the event of bending, stretching, compression, or in the event of torsions, while this would not be the case with spherical conductive particles.

Using the plate-shaped, dendritic, or other oblong conductive particles, therefore flexible, supple, elastic, and simultaneously conductive polymers for medical and orthopedic applications can be produced, which simultaneously remain conductive and able to be mechanically strained, in particular flexible. It is also important that by way of suitable concentration settings, the conductivity can also be fundamentally maintained in the event of mechanical load, such as bending, stretching, or twisting. The gradual change of the conductivity in the event of bending or stretching can be used for sensory applications.

The concentration of conductive particles is, in vol-% with respect to the conductive polymer, in total
  in the case of silicone elastomers (silicone rubbers), including LSR (liquid silicone rubber) and including HTV and RTV silicone elastomer systems, preferably between 10% and 25%, preferably between 15% and 22%;
  in the case of thermoplastic elastomers, for example, TPU (thermoplastic polyurethanes), preferably between 5% and 30%, preferably between 7% and 25%;
  in the case of elastomeric polyurethanes and polyurethane gels, preferably between 5% and 30%, preferably between 10% and 25%.

Instead of the plate-shaped particles, which are commercially available as conductive pigments, in the scope of this invention, dendritic conductive particles and/or other oblong conductive particles having a ratio of length to width greater than or equal to 2 can also be used as conductive solid particles. Other particles which are oblong, but not plate-shaped, may be, for example, cylindrical or "cigar-shaped" particles or needles.

"Dendritic conductive particles" are those having a branched structure. Metallic particles in the form of dendritic powders, i.e., having a dendritic, bushy type of powder grain preferably come into consideration here. In particularly preferred embodiments, the dendritic metal particles are dendritic silver or copper particles (also mixed-metallic).

All of these suitable particles, which can be light-refractive colorless to gray/anthracite as a solid, do not color the base polymer black, so that a nonblack conductive polymer material is obtained, which can additionally be dyed as desired.

According to the invention, the base polymer in this conductive polymer material is an elastomer, specifically a flexible and/or resilient elastomer having a measurable reversible longitudinal resiliency. The resiliency of the base polymer until fracture (elongation at fracture, DIN 53504) is preferably at least 150%. According to the invention, up to a (longitudinal) elongation of at least 25%, a conductivity is to be maintained, in the particularly preferred embodiments up to an elongation of 100%. The elastomer can be a thermoplastic elastomer. Non-vulcanized, i.e., non-cross-linked precursor stages of elastomers are also included as elastomers here.

The conductive solid particles are to be homogeneously distributed or dispersed in the base polymer and are not to be restricted to specific volume regions of a polymer body, for example, also in the form of layers or clusters. This relates in particular to the application as electrodes or sensor material and is necessary therein to ensure reproducible measured values.

Preferred base polymers are silicones, elastic polyurethanes, thermoplastic polyurethanes, polyurethane gels, latex, rubbers, or synthetic rubbers.

The preferred silicones comprise silicone rubbers or silicone elastomers, including LSR (liquid silicone rubber) as a one-component or two-component material, both as HTV (high temperature cross-linking) and also RTV (room temperature cross-linking) silicones. For the definition of silicones and the description of the typical properties, reference is made to Ullmann's Encyclopedia of Industrial Chemistry, 5th Ed., VCH 1993, Vol. A24, Silicones, pages 57-81.

The preferred polyurethanes comprise elastic polyurethanes (polyurethane elastomers), thermoplastic polyurethanes, and polyurethane gels. For the definition of polyurethanes and the description of the typical properties, reference is made to Ullmann's Encyclopedia of Industrial Chemistry, 5th Ed., VCH 1992, Vol. A21, Polyurethanes, pages 665-711, and for thermoplastic polyurethanes (TPU) in particular to pages 702-703, and to "Oertel, G., Polyurethane—Kunststoffhandbuch [Polyurethanes—Plastics Handbook]", third edition, Hanser-Verlag, Munich, 1993, chapter 8.2, pages 455-467.

For the preferred polyurethane gels, reference is made to EP 57838 and EP 511570, from which a person skilled in the art can infer suitable polyurethane gels.

In a refinement of the invention, it is provided that the base polymer contains, in addition to the conductive particles of the groups a), b), and/or c), further conductive solid particles, specifically spherical conductive particles. "Spherical" particles are also understood here as those which have an irregular, but substantially spherical shape, without being "elongated". The spherical particles are preferably to have a substantially smooth surface, which can be displayed in good pourability of these solid particles, for example. The spherical particles accordingly also include particles having a not exactly spherical, spheroid shape. The spherical particles also include hollow spheres. Metal particles are suitable as spherical conductive particles, but preferably conductively coated inorganic fillers, primarily so-called "white" fillers, are used. Silicon dioxide, titanium dioxide, or barium sulfate can again advantageously be used as carrier materials. Other mineral oxides and hydroxides, such as, inter alia, aluminum oxide or aluminum hydroxide, are also suitable. Particles suitable for the invention are known, for example, from EP 0 359 569, to which reference is hereby made. This describes hollow spheres made of silicon dioxide, which are coated using antimony-doped tin oxide.

The spherical conductive particles preferably have a diameter between 500 nm and 25 μm, and more preferably between 1 μm and 5 μm.

The volume ratio of the spherical conductive particles to the plate-shaped, dendritic, or oblong conductive particles is preferably in the range from 10:90 to 90:10 and in particular in the range from 10:90 to 60:40.

Further advantages result if the conductive particles are aligned in the base polymer. I.e., the main axes of the particles of a), b), or c) can therefore have a preferential direction when summed over all directions and the electrical conductivity of the material can be anisotropic overall. Surprisingly, it has been shown that this additional alignment of the conductive particles allows a further reduction of the percolation threshold. It is sufficient if the alignment causes the conductive particles to be at least partially aligned with respect to neighboring particles and in particular partially concatenated to form chains. A linear alignment of the chains or a chain preferential direction is not necessary. If materials having significantly anisotropic properties are desired for specific measuring purposes, this can be brought about by suitable measures, as described in greater detail hereafter.

According to one additional aspect of the invention, the conductive polymer material can additionally contain an intrinsically conductive polymer, wherein a fraction of up to 30 wt.-%, preferably of up to 15 wt.-%, is preferred. The intrinsically conductive polymer is only added in a subordinate quantity, since these materials can be stiff or brittle and are not suitable as base polymers for the intended purposes sought here. The intrinsically conductive polymers can be used for the purpose, however, of reducing the conductivity per weight part of conductive solid particles, so that the fraction of solid fillers can be reduced further, if this is desired. For example, polyanilines, polyacetylenes, polythiophene, polypyrrole, polyphenylene, and poly(phenylvinylidene) are suitable as intrinsically conductive polymers.

The conductive polymer material according to the invention can be used in greatly varying fields of application. Due to the high flexibility and resiliency of an elastomer, the possibility exists of producing thin films of the material. The low thermal conductivity of the polymer material is accompanied by increased wearing comfort, above all in comparison to metallic electrodes. Because of these properties, according to the invention, the use of the conductive polymer material according to the invention is provided for electrodes or sensors, in particular in the medical or clinical field. The invention allows a use of the novel material in electrodes for signal acquisition, signal generation, and stimulation, i.e., measuring electrodes, stimulation electrodes, sensors, in particular moisture sensors or stimulus transmission sensors, in general measuring feelers, and flexible conductor paths. The conductive polymer material according to the invention is usable, inter alia, for dry electrodes, since contact gels can be omitted. It is suitable for FES and TENS applications. In the medical field, the conductive materials according to this invention can be used in medical and sanitary-technical accessories, for example, in elastic bandages, liners, sleeves, ortheses, prostheses, padding materials, shafts, and many more.

Furthermore, a skin overlay is provided to achieve the object according to the invention, which contains the conductive polymer material according to this invention, for example, in combination with an underlying permeable or semipermeable membrane or a nonwoven material or also in general in the form of a film, a pad, or a cushion, integrated in a medical device (for example, for diagnosis, monitoring, or therapy), an orthopedic support apparatus, or the like.

The invention also comprises a special method for producing a conductive polymer material. As already described above, an alignment of the conductive particles of the groups a), b), and c) in the base polymer allows the same electrical conductivity as with a higher fraction of nonaligned particles to be achieved using a relatively smaller weight fraction of conductive solid particles. By way of the method according to the invention, therefore in general electrically conductive plastics or polymers having good conductivity and a relatively low fraction of conductive solids are provided.

The method according to the invention provides that a base polymer is admixed during its production or in the molten or dissolved state with at least the following conductive particles:
  a) plate-shaped, conductive particles and/or
  b) dendritic, conductive particles and/or
  c) other oblong, conductive particles having a ratio of length to width greater than or equal to 2 and also optionally additionally spherical conductive particles,
    and that an alignment of the particles is performed in the not yet reacted polymer compound or the dissolved or molten polymer compound and is fixed upon solidification of the polymer.

The conductive polymer material is to contain the solid particles distributed and dispersed over its volume. The most homogeneous distribution possible is sought.

Any of the above-mentioned polymers or polymer mixtures is suitable as a base polymer. In addition, thermoplastic polymers and duroplasts are also suitable here, which can be finished so as to be conductive in the described manner. An additionally preferred base polymer, which can be made conductive using the method according to the invention, is acrylate or methacrylate or acrylic resin. "During its production" means that the method can be carried out on reactive compounds, for example, reacting polycondensates such as polyurethanes. Alternatively, polymerized polymers can be melted or dissolved and then admixed with the conductive particles. The solvent, if present, is subsequently removed in a conventional manner, i.e., the material is permitted to cure.

The alignment of the particles in the still liquid or liquid-viscous polymer compound can be performed by any mechanical or physical method, using which viscous compounds can be oriented. Preferably, this can involve permitting the polymer compound to flow, in which the elongated particles will align themselves in the viscously flowing compound.

The alignment can also be performed by scraping. The compound is also forced to have an inner flow here, which aligns the non-spherically symmetrical particles. Further possibilities for aligning the particles are provided by extrusion or other pressing through a die. The methods for drawing films are also suitable for the alignment of the non-spherical particles contained in the drawn polymer compound, specifically the particles of the groups a), b), and c).

The invention will be explained in greater detail hereafter on the basis of exemplary embodiments. Formula examples are specified, which are to make it easier to understand the invention, without the scope of the disclosure being restricted thereby. A person skilled in the art can find corresponding further examples, by combining the specifications made in the above general description.

The formula examples are supplemented by SEM (scanning electron microscope) photographs, which are shown as figures, and tests of the conductivity of the conductive polymer materials with associated tables.

EXAMPLE PART

Base Materials:
- Silicone (Rhodia SILBIONE®) RTV 4411; 617D35/D36); mixing ratio (A:B) 10:1
- thermoplastic polyurethane (TPU) (See-Piastik GmbH, SEETHAN® 2403K; solid content 17%; 617D44)
- acrylic resin (Orthocryl, lamination resin 80:20+2% BPO curing agent 617H19)

Additives:
- Conductive pigments, e.g., Merck Minatec®—60 CM, optionally 40 CM, mica laminations conductively coated using antimony-doped tin oxide, optionally additionally conductively coated spherical inorganic fillers (Milliken Zelec®S (silicon dioxide core), Milliken Zelec®T (titanium oxide core), having particle sizes in the range from 1 μm to 5 μm), Merck Minatec® 60 CM, Merck MinaLec® 40 CM, Merck Minatec® 31 CM, Merck Minatec® 51 CM
- dendritic metal particles (Ag, Cu), silver particles AMI DODUCO (1:GN1; 2:AGPE0160-6)

Intrinsic Conductive Polymer:
- Clevios FE
- ORMECON L 5000/C9000
- Panipol W, solvent water (polyaniline)

Solvent:
- tetrahydrofuran
- HMDS (hexamethyl disiloxane), for example, Dow Corning, 200 R fluid, 0.65 cSt Formula Examples:
The abbreviations denote:
$m_A$: mass of additive; $m_P$: mass of polymer; $m_{PG}$ mass of polymer mixture; $m_{PA}$ mass of component A (polymer); $m_{PB}$: mass of component B (polymer); $m_L$: mass of solvent; $m_{iP}$: mass of intrinsically conductive polymer;

First Formula:
TPU with dendritic silver particles
base material: TPU (SEETHAN® 2403K; solid content 17%)
additive: dendritic silver particles (AMI DODUCO GN1/AGPE0160-6)

$m_{PG}$=12.00 g($m_P$=2.04 g)(30 mass-%)  1.

$m_A$=4.76 g(70 mass-%)  2.

$m_{PG}$+$m_A$;$t$=2 minutes mixing  3.

Evacuate sample (desiccator): $p$=400 mbar pulsing; $t$=30 seconds (by pulsing aeration and deaeration, ultrafine bubbles may be evacuated)  4.

Apply sample  5.

$THF$ (solvent),permit to diffuse,$t$=5 hours  6.

Furnace $T$=60° C.,$t$=5 hours  7.

Second Formula:
TPU with dendritic silver particles
base material: TPU (SEETHAN® 2403K; solid content 17%)
additive: dendritic silver particles (AMI DODUCO GN1/AGPE0160-6)

$m_{PG}$=12.00 g($m_P$=2.04 g)(20 mass-%)

$m_A$=8.16 g(80 mass-%)

Processing similar to item 1

Third Formula:
TPU with conductive pigments
base material: TPU (SEETHAN® 2403K; solid content 17%)
additive: Minatec® 60 CM $m_{PG}$=52.00 g($m_P$=8.84 g)(69 mass-%)

$m_A$=23.36 g(31 mass-%)

Processing similar to item 1

Fourth Formula:
TPU with conductive pigments
base material: TPU (SEETHAN® 2403K; solid content 17%)
additive: Minatec® 60 CM $m_{PG}$=52.00 g($m_P$=8.84 g)(62 mass-%)

$m_A$=31.87 g(38 mass-%)

Processing similar to item 1

Fifth Formula
TPU with conductive pigments
base material: TPU (SEETHAN®) 2403K; solid content 17%)
additive: Minatec® 40 CM $m_{PG}$=52.00 g($m_P$=8.84 g)(62 mass-%)

$m_A$=31.87 g(38 mass-%)

Processing similar to item 1

Sixth Formula
TPU with conductive pigments
base material: TPU (SEETHAN® 2403K; solid content 17%)
additive: Minatec® 31 CM $m_{PG}$=52.00 g($m_P$=8.84 g)(62 mass-%)

$m_A$=31.87 g(38 mass-%)

Processing similar to item 1

Seventh Formula
TPU with conductive pigments
base material: TPU (SEETHAN® 2403K; solid content 17%)
additive: Minatec® 51 CM $m_{PG}$=52.00 g($m_P$=8.84 g)(62 mass-%)

$m_A$=31.87 g(38 mass-%)

Processing similar to item 1

Eighth Formula
TPU with conductive pigments base material: TPU (SEETHAN® 2403K; solid content 17%)
additive: Zelec® S $m_{PG}$=52.00 g($m_P$=8.84 g)(62 mass-%)  1.

$m_A$=31.87 g(38 mass-%)  2.

Processing similar to item 1

Ninth Formula
TPU with conductive pigments
base material: TPU (SEETHAN® 2403K; solid content 17%)
additive: Zelec® T $m_{PG}$=52.00 g($m_P$=8.84 g)(62 mass-%)  1.

$m_A$=31.87 q(38 mass-%)  2.

Processing similar to item 1

Tenth Formula:
Silicone with conductive pigments
base material: silicone (Rhodia SILBIONE® RTV 4411)
additive: Minatec® 60 CM $m_{PA}$=5.00 g  1.

$m_A$=4.15 g(43 mass-%)  2.

$m_L$=3.20 g(HMDS)  3.

$m_{PA}+m_A+m_L;t$=5 minutes mixing  4.

$m_{PB}$=0.50 g($m_{PA}+m_{PB}$→57 mass-%)  5.

$m_{PA}+m_A+m_L+m_{PB};t$=3 minutes mixing  6.

Evacuate sample (desiccator): $p$=200 mbar;$t$=30 seconds  7.

Apply sample  8.

Permit solvent to diffuse,$t$=5 hours  9.

Furnace,$T$=75° C.,$t$=12 hours  10.

Eleventh Formula:
TPU with conductive pigments and intrinsically conductive polymer
base material: silicone (Rhodia SILBIONE® RTV 4411)
additive: Minatec® 60 CM, Clevios FE (Ormecon C 9000, Ormecon L 5000, Panipol W)

$m_{PG}$=12.00 g($m_P$=2.04 g)(60 mass-%)  1.

$m_A$=0.68 g(Minatec® 20 mass-%)  2.

$m_{iP}$=0.68 g(Ormecon C 9000 20 mass-%)  3.

$m_{PG}+m_A+m_{iP};t$=2 minutes mixing  4.

Evacuate sample (desiccator): $p$=400 mbar pulsing; $t$=30 seconds (by pulsing aeration and deaeration, ultrafine bubbles may be evacuated)  5.

Apply sample  6.

THF (solvent),permit to diffuse,$t$=5 hours  7.

Furnace $T$=60° C.,$t$=5 hours  8.

Twelfth Formula
Silicone with conductive pigments and intrinsically conductive polymer
base material: silicone (Rhodia SILBIONE® RTV 4411)
additive: Minatec® 60 CM (Clevios FE, Ormecon C 9000, Ormecon L 5000, Panipol W)

$m_{PA}$=5.00 g  1.

$m_A$=4.15 g(42 mass-%)  2.

$m_L$(HMDS)  3.

$m_{iP}$=0.40 g(4 mass-% Panipol W)  4.

$m_{PA}+m_A+m_L+m_{iP};t$=5 minutes mixing  5.

$m_{PA}$=0.50 g($m_{PA}+m_{PB}$→54 mass-%)  6.

$m_{PA}+m_A+m_L+m_{iP}+m_{PB};t$=3 minutes mixing  7.

Evacuate sample (desiccator): $p$=200 mbar;$t$=30 seconds  8.

Apply sample  9.

Permit solvent to diffuse,$t$=5 hours  10.

Furnace,$T$=75° C.,$t$=12 hours  11.

Thirteenth Formula
Silicone having spherical metallic additives
base material: silicone (Rhodia SILBIONE® RTV 4411)
additive: spherical silver-copper particles (Foxmet S.A.)

$m_{PA}$=5.00 g  1.

$m_A$=63.25 g(92 mass-%)  2.

$m_{PB}$=0.50 g($m_{PA}+m_{PB}$→8 mass-%)  3.

$m_{PA}+m_A\ m_{PB};t$=5 minutes mixing  4.

Evacuate sample (desiccator): $p$=200 mbar;$t$=30 seconds  5.

Apply sample  6.

Furnace,$T$=75° C.,$t$=4 hours  7.

Fourteenth Formula
Acrylic resin with conductive pigments
base material: Orthocryl®
additive: Minatec® 60 CM $m_{PA}$=40.10 g(58 mass-%)  1.

$m_A$=27.66 g(40 mass-%)  2.

$m_L$(diluent)  3.

$m_{PB}$=1.38 g(2 mass-% curing agent)  4.

CONDUCTIVITY TESTS

1. Two-wire Circuit:

The specific contact resistance of the sample bodies is determined from the contact resistance and the thickness of the sample body. A two-wire circuit is used for this purpose. Planar front and rear side contacting of a thin film-type sample body having a round surface (r=16 mm) is performed by means of round measuring electrodes. The measurement of the resistance is carried out by means of DMM VC 940 (VOLTCRAFT®, DE). The lower contact electrode is formed by a gold-plated contact pad, the upper counter electrode by a round titanium electrode.

2. Four-point Measurement

The four-point method is a standard measuring method from semiconductor technology. The sample body is contacted with four equidistant points arranged in a colinear manner in a Wenner arrangement. A defined constant current is applied via the outer points and the potential drop is measured via the inner points.

Tests of Mechanical Properties—Tensile Tests

With the aid of the tensile test, the influence of the additive content on the mechanical properties of the base polymer is studied and evaluated. The tensile test is carried out on a testing machine "Zwick Z010" (producer Roell) using an S2 sample body. The tensile test is a standard method according to DIN EN ISO 527 to ascertain the material behavior in the case of single-axis, uniform tensile stress distributed over the cross-section. The characteristic values may be ascertained from the stress-strain graph (SSG). For rubber-elastic materials, a type III strain graph is expected. The yield stress is the first maximum in the SSG, the tensile strength is the tensile stress at maximum force, and the tear resistance is the tensile stress at the moment of tearing. To compare the polymer samples, the yield stress is selected. All tensile tests are carried out without prior load of the sample bodies, the ascertained mechanical values are initial strain values.

Tables

The abbreviations indicated in the following tables have the following meanings:

$m_A$: mass of additive [kg]; $m_P$: mass of polymer [kg]; $m_{PG}$: mass of polymer mixture [kg]; $m_{PA}$: mass of polymer component A [kg]; $m_{PB}$: mass of polymer component B [kg]; $c_{mA}$: mass concentration of the additive [%]; $c_{mP}$: mass concentration of polymer [%]; $c_{VA}$: volume concentration of the additive Vol; $c_{VP}$: volume concentration of the polymer [%];

$\rho_D$: specific electrical contact resistance [Ωm];
$\rho_S$: specific electrical layer resistance [Ωm];
$\sigma_D$: specific electrical contact conductivity [S/m];
$\sigma_S$: specific electrical layer conductivity [S/m];
$\sigma$: mechanical stress [N/m$^2$]

Figure 1:
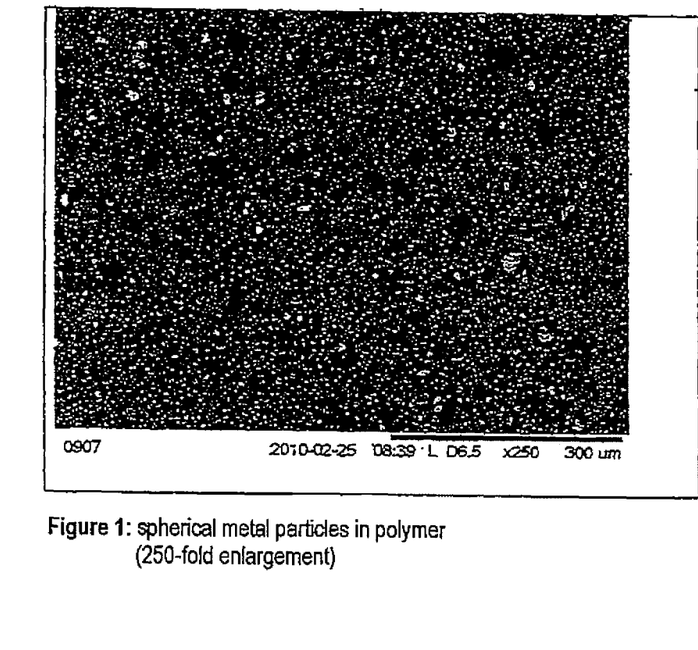
FIG. 1 SEM photograph of a polymer having spherical metal particles in 250-fold enlargement.
Figure 2:
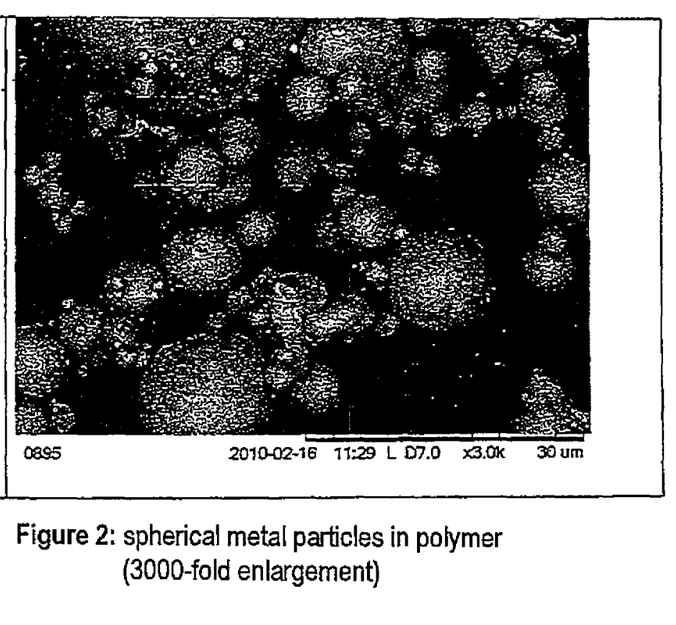
FIG. 2 like FIG. 1, in 3000-fold enlargement.

As FIGS. 1 and 2 show in conjunction with Table 7, a conductive elastomer in the sense of this invention cannot be obtained using spherical conductivity additives, since the particles are still individually enclosed by polymer and thus insulated, even at high concentration.

Figure 3:
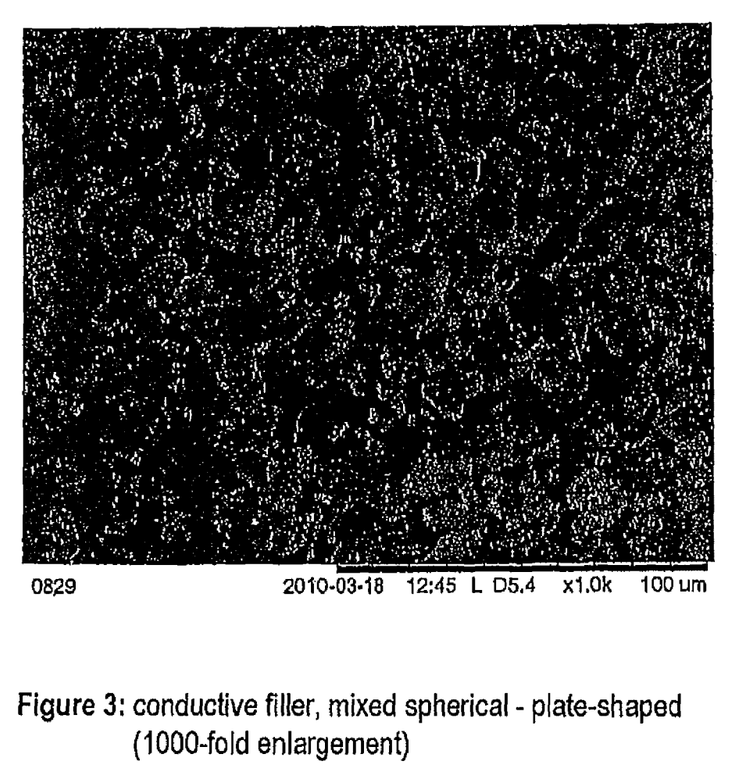
FIG. 3 SEM photograph of a conductivity additive, mixed from plate-shaped and spherical particles, 1000-fold enlargement.

The situation is different in the case of plate-shaped or oblong particles, as shown in FIG. 3 (in the mixture with spherical particles). Using these particles, the percolation threshold is exceeded significantly earlier, so that less conductivity additive is necessary to achieve a specific desired conductivity. The mechanical properties of the base polymer are disturbed less by the lower content of conductive particles.

Plate-shaped or elongated particles also maintain contact better under mechanical load of a body made of the conductive polymer—for example, in the event of bending movements, elongations, or tortions—so that conductivity is retained.

The retention of the properties is confirmed by the data in the tables.

The scale on the right lower edge of FIGS. 1 to 3 is as follows:

in FIG. 1: 300 μm, in FIG. 2: 30 μm, in FIG. 3: 100 μm.

Alignment of Plate-Shaped Particles

Figure 4:
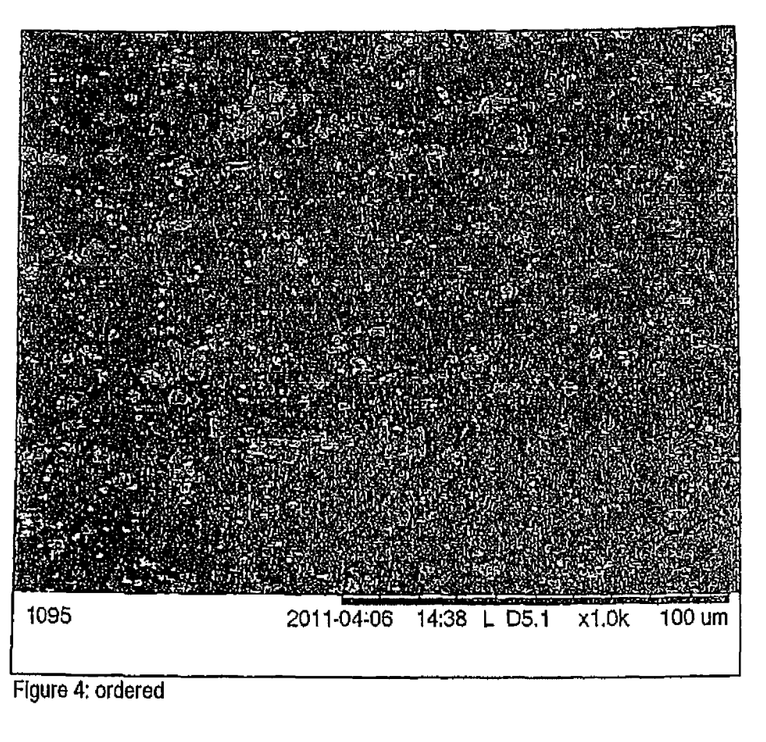
FIG. 4 SEM photograph of a conductivity additive in TPU, aligned.
Figure 5:
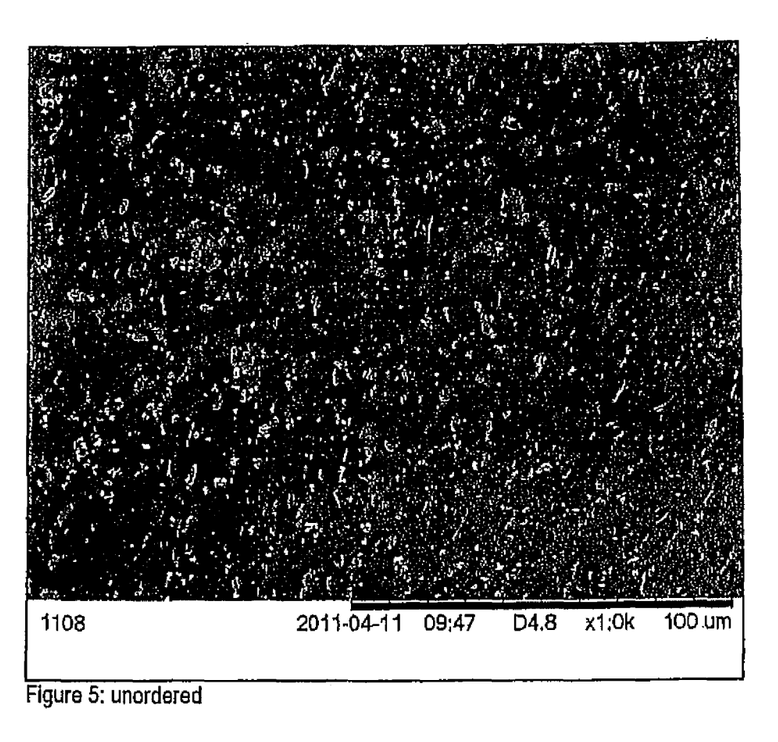
FIG. 5 like FIG. 4, but unaligned/unordered.

FIGS. 1 and 5 show the effect of the alignment of plate-shaped particles. FIG. 4 shows the scanning electron microscope photograph of a cross-sectional view through a sample piece made of TPU with plate-shaped conductive particles, which were aligned during the production of the layer by scraping. A state of increased order results in relation to the nonaligned or unordered, but otherwise completely corresponding material, as shown in FIG. 5 (the scale at the right lower edge of the figure is 100 μm in each case in FIGS. 4 and 5). As can be seen from FIG. 4, the plates partially become ordered and concatenate to form chain-like formations. The percolation is increased. Ordered and unordered or aligned and nonaligned states can be visually differentiated.

TPU with Ag Particles of Dendritic Form a→silver powder GN1
b→silver powder AGPE0160-6

TABLE 1

| | formula specifications - TPU with dendritic Ag particles | | | | | | | |
|---|---|---|---|---|---|---|---|---|
| | additive content AMI DODUCO silver powder | | TPU-THF | TPU net (18.35%) | | | Vol-% | |
| sample number | mass-% | | mixture | mass-% | | THF additive | Ag | TPU |
| | $c_{mA}$ | $m_A$ | $m_{PG}$ | $m_P$ | $c_{mP}$ | | $c_{VA}$ | $c_{VP}$ |
| 6 a | 89.7% | 10.500 g | 6.54 g | 1200 g | 10.3% | — | 50% | 50% |
| 6 b | | | | | | — | | |
| 7 a | 85.4% | 5.535 g | 5.171 g | 0.949 g | 14.6% | — | 40% | 60% |
| 7 b | | 5.520 g | 5.157 g | 0.946 g | | — | | |
| 8 a | 78.9% | 4.906 g | 7.130 g | 1.308 g | 21.1% | — | 30% | 70% |
| 8 b | | 5.290 g | 7.688 g | 1.411 g | | — | | |
| 9 a | 68.6% | 4.761 g | 11.861 g | 2.176 g | 31.4% | — | 20% | 80% |
| 9 b | | 4.827 g | 12.025 g | 2.207 g | | — | | |
| 10 a | 65.8% | 3.359 g | 9.530 g | 1.749 g | 34.2% | — | 18% | 82% |
| 10 b | | 3.035 g | 8.611 g | 1.580 g | | — | | |

TABLE 1-continued formula specifications - TPU with dendritic Ag particles

| sample number | additive content AMI DODUCO silver powder mass-% $c_{mA}$ | $m_A$ | TPU-THF mixture $m_{PG}$ | TPU net (18.35%) mass-% $m_P$ | $c_{mP}$ | THF additive | Vol-% Ag $c_{VA}$ | TPU $c_{VP}$ |
|---|---|---|---|---|---|---|---|---|
| 11 a | 62.5% | 2.241 g | 7.328 g | 1.345 g | 37.5% | — | 16% | 84% |
| 11 b |  | 2.580 g | 8.436 g | 1.548 g |  | — |  |  |

TABLE 2 results table - TPU with dendritic Ag particles

| | electrical properties layer | |
|---|---|---|
| sample number | $\rho_S/[\Omega \cdot cm]$ | $\sigma_S/[S/cm]$ |
| 6 a | 1.215 | 0.823 |
| 6 b | 0.845 | 1.183 |
| 7 a | 1.276 | 0.784 |
| 7 b | 1.215 | 0.823 |
| 8 a | 5.13 | 0.195 |
| 8 b | 4.30 | 0.233 |
| 9 a | 16.09 | 0.062 |
| 9 b | 14.02 | 0.071 |
| 10 a | 48.91 | 0.020 |
| 10 b | 40.55 | 0.025 |
| 11 a | 144.20 | 0.007 |
| 11 b | 73.58 | 0.014 |

Silicone Rhodia SILBIONE® RTV4411 with Minatec® 60 CM

TABLE 3 formula specifications - silicone with Minatec ®

| sample number | additive content Minatec ® 60 CM mass-% $c_{mA}$ | $m_A$ | Silicone Rhodia RTV 4411 component mass-% $m_{PA}$ | $m_{P3}$ | $c_{mP}$ | +35% HMDS ($m_{PA} + m_A \to 100\%$) | Vol-% Minatec $c_{VA}$ | Silicone $c_{VP}$ |
|---|---|---|---|---|---|---|---|---|
| 12 | 38% | 3.370 g | 5.000 g | 0.500 g | 62% | 2.930 g | 16.8% | 83.2% |
| 13 | 39% | 3.510 g | | | 61% | 2.980 g | 17.4% | 82.6% |
| 14 | 40% | 3.670 g | | | 60% | 3.030 g | 18.0% | 82.0% |
| 15 | 41% | 3.820 g | | | 59% | 3.090 g | 18.6% | 81.4% |
| 16 | 42% | 3.980 g | | | 58% | 3.140 g | 19.2% | 80.8% |
| 17 | 43% | 4.150 g | | | 57% | 3.200 g | 19.9% | 80.1% |
| 18 | 44% | 4.320 g | | | 56% | 3.260 g | 20.6% | 79.4% |
| 19 | 45% | 4.500 g | | | 55% | 3.330 g | 21.2% | 78.8% |

TABLE 4 results table - specific electrical conductivity (silicone/Minatec ®)

| sample number | Number of sample bodies | electrical properties contact $\rho_D/[\Omega \cdot cm]$ | $\sigma_D/[S/cm]$ | Percentage measurement deviation $\Delta\sigma_{D,s}/\sigma_D$ | Mechanical properties Yield stress [N/mm²] | Elongation at yield [%] |
|---|---|---|---|---|---|---|
| 12 | 9 | $18.1 \cdot 10^6$ | $(0.055 \pm 0.041) \cdot 10^{-6}$ | 74.6% | 0.87 | 61 |
| 13 | | $8.68 \cdot 10^6$ | $(0.115 \pm 0.070) \cdot 10^{-6}$ | 60.8% | 0.89 | 62 |
| 14 | | $3.27 \cdot 10^6$ | $(0.306 \pm 0.087) \cdot 10^{-6}$ | 28.5% | 0.94 | 56 |
| 15 | | $1.55 \cdot 10^6$ | $(0.65 \pm 0.27) \cdot 10^{-6}$ | 42.4% | 0.81 | 44 |
| 16 | | $0.629 \cdot 10^6$ | $(1.59 \pm 0.45) \cdot 10^{-6}$ | 28.2% | 1.00 | 40 |
| 17 | | $0.388 \cdot 10^6$ | $(2.6 \pm 1.1) \cdot 10^{-6}$ | 41.3% | 0.96 | 34 |
| 18 | | $0.276 \cdot 10^6$ | $(3.6 \pm 1.5) \cdot 10^{-6}$ | 40.6% | 0.73 | 28 |
| 19 | | $0.174 \cdot 10^6$ | $(5.8 \pm 1.8) \cdot 10^{-6}$ | 30.7% | 0.35 | 15 |

TPU SEETHAN® 2403 K with Minatec® 60 CM

TABLE 5 formula specifications - TPU with Minatec®

| sample number | additive content Minatec® 60 CM mass-% $c_{mA}$ | $m_A$ | TPU-THF mixture $m_{PG}$ | TPU net (18.35%) $m_P$ | mass-% $c_{mP}$ | THF additive | Vol-% Minatec $c_{VA}$ | TPU $c_{VP}$ |
|---|---|---|---|---|---|---|---|---|
| 20 | 17% | 3.312 g | 88.122 g | 16.170 g | 83% | — | 6.7% | 93.3% |
| 21 | 18% | 1.074 g | 26.633 g | 4.887 g | 82% | — | 7.2% | 92.8% |
| 22 | 19% | 3.083 g | 71.626 g | 13.143 g | 81% | — | 7.6% | 92.4% |
| 23 | 20% | 4.022 g | 87.673 g | 16.088 g | 80% | — | 8.1% | 91.9% |
| 24 | 22% | 4.122 g | 79.642 g | 14.614 g | 78% | — | 9.1% | 90.9% |
| 25 | 24% | 5.447 g | 93.999 g | 17.249 g | 76% | — | 10.0% | 90.0% |
| 26 | 26% | 3.033 g | 47.043 g | 8.632 g | 74% | — | 11.0% | 89.0% |
| 27 | 31% | 4.339 g | 52.631 g | 9.658 g | 69% | — | 13.7% | 86.3% |
| 28 | 38% | 3.162 g | 28.115 g | 5.159 g | 62% | — | 17.8% | 82.2% |
| 29 | 39% | 5.378 g | 45.841 g | 8.412 g | 61% | — | 18.4% | 81.6% |
| 30 | 40% | 3.609 g | 29.501 g | 5.413 g | 60% | — | 19.0% | 81.0% |
| 31 | 41% | 4.058 g | 31.823 g | 5.840 g | 59% | — | 19.7% | 80.3% |
| 32 | 42% | 4.101 g | 30.863 g | 5.663 g | 58% | — | 20.4% | 79.6% |
| 33 | 43% | 4.054 g | 29.286 g | 5.374 g | 57% | — | 21.0% | 79.0% |
| 34 | 44% | 5.466 g | 37.911 g | 6.957 g | 56% | — | 21.7% | 78.3% |
| 35 | 45% | 5.243 g | 34.922 g | 6.408 g | 55% | — | 22.4% | 77.6% |
| 36 | 46% | 4.936 g | 31.577 g | 5.794 g | 54% | — | 23.1% | 76.9% |
| 37 | 47% | 5.220 g | 32.078 g | 5.886 g | 53% | — | 23.8% | 76.2% |
| 38 | 48% | 4.284 g | 25.292 g | 4.641 g | 52% | — | 24.6% | 75.4% |
| 39 | 49% | 5.259 g | 29.829 g | 5.474 g | 51% | 4.0 g | 25.3% | 74.7% |
| 40 | 50% | 8.663 g | 47.210 g | 8.663 g | 50% | 3.7 g | 26.1% | 73.9% |
| 41 | 51% | 8.135 g | 42.594 g | 7.816 g | 49% | 3.7 g | 26.9% | 73.1% |
| 42 | 52% | 6.866 g | 34.539 g | 6.338 g | 48% | 4.3 g | 27.7% | 72.3% |

TABLE 6 results table - specific electrical conductivity (TPU/Minatec®)

| sample number | Number of sample bodies | electrical properties contact $\rho_D/[\Omega \cdot cm]$ | $\sigma_D/[S/cm]$ | Percentage measurement deviation $\Delta\sigma_{D,d}/\sigma_D$ | Mechanical properties Yield stress [N/mm²] | Elongation at yield [%] |
|---|---|---|---|---|---|---|
| 20 | 5 | — | — | — | 37.53 | 623 |
| 21 | | — | — | — | 36.15 | 636 |
| 22 | | 85.0 · 10⁶ | 0%: (0.012 ± 0.022) · 10⁻⁶ | 186.1% | 31.43 | 556 |
|  |  | 37.5 · 10⁶ | 57%: (0.027 ± 0.061) · 10⁻⁶ | 229.4% |  |  |
|  |  | 56.8 · 10⁶ | 99%: (0.017 ± 0.033) · 10⁻⁶ | 186.6% |  |  |
| 23 |  | 21.3 · 10⁶ | 0%: (0.047 ± 0.057) · 10⁻⁶ | 120.8% | 32.02 | 574 |
|  |  | 22.4 · 10⁶ | 57%: (0.045 ± 0.048) · 10⁻⁶ | 108.4% |  |  |
|  |  | 23.0 · 10⁶ | 99%: (0.044 ± 0.027) · 10⁻⁶ | 63.0% |  |  |
| 24 |  | 2.76 · 10⁶ | 0%: (0.36 ± 0.32) · 10⁻⁶ | 89.2% | 30.04 | 529 |
|  |  | 3.47 · 10⁶ | 57%: (0.29 ± 0.19) · 10⁻⁶ | 66.8% |  |  |
|  |  | 3.97 · 10⁶ | 99%: (0.25 ± 0.18) · 10⁻⁶ | 72.2% |  |  |
| 25 |  | 431 · 10³ | 0%: (2.3 ± 1.0) · 10⁻⁶ | 44.1% | 31.47 | 607 |
|  |  | 632 · 10³ | 57%: (1.58 ± 0.61) · 10⁻⁶ | 38.6% |  |  |
|  |  | 640 · 10³ | 99%: (1.56 ± 0.93) · 10⁻⁶ | 59.4% |  |  |
| 26 |  | 171 · 10³ | 0%: (5.83 ± 0.85) · 10⁻⁶ | 14.7% | 8.01 | 57.9 |
|  |  | 239 · 10³ | 57%: (4.2 ± 1.4) · 10⁻⁶ | 32.2% |  |  |
|  |  | 243 · 10³ | 99%: (4.1 ± 2.1) · 10⁻⁶ | 49.7% |  |  |
| 27 |  | 70.5 · 10³ | 0%: (14.2 ± 4.8) · 10⁻⁶ | 34.1% | 7.96 | 27.0 |
|  |  | 75.6 · 10³ | 57%: (13.2 ± 6.1) · 10⁻⁶ | 46.4% |  |  |
|  |  | 86.4 · 10³ | 99%: (11.6 ± 8.0) · 10⁻⁶ | 68.8% |  |  |
| 28 |  | 29.7 · 10³ | 0%: (34 ± 32) · 10⁻⁶ | 94.3% | 8.10 | 18.9 |
|  |  | 43.0 · 10³ | 57%: (23 ± 14) · 10⁻⁶ | 58.6% |  |  |
|  |  | 28.9 · 10³ | 99%: (35 ± 15) · 10⁻⁶ | 42.4% |  |  |
| 29 |  | 55.3 · 10³ | 0%: (18 ± 16) · 10⁻⁶ | 89.2% | 7.66 | 17.0 |
|  |  | 88.0 · 10³ | 57%: (11.4 ± 18.3) · 10⁻⁶ | 72.7% |  |  |
|  |  | 63.5 · 10³ | 99%: (15.8 ± 7.7) · 10⁻⁶ | 48.6% |  |  |

TABLE 6-continued results table - specific electrical conductivity (TPU/Minatec ®)

| sample number | Number of sample bodies | electrical properties $\rho_D/[\Omega \cdot cm]$ | contact $\sigma_D/[S/cm]$ | Precentage measurement deviation $\Delta\sigma_{D,q}/\sigma_D$ | Yield stress [N/mm²] | Elongation at yield [%] |
|---|---|---|---|---|---|---|
| 30 | | $31.0 \cdot 10^3$ | 0%: $(32 \pm 31) \cdot 10^{-6}$ | 95.4% | 8.61 | 16.2 |
| | | $51.0 \cdot 10^3$ | 57%: $(20 \pm 16) \cdot 10^{-6}$ | 82.4% | | |
| | | $28.2 \cdot 10^3$ | 99%: $(36 \pm 26) \cdot 10^{-6}$ | 73.1% | | |
| 31 | | $49.3 \cdot 10^3$ | 0%: $(20 \pm 13) \cdot 10^{-6}$ | 65.3% | 8.25 | 15.6 |
| | | $77.1 \cdot 10^3$ | 57%: $(13.0 \pm 6.5) \cdot 10^{-6}$ | 50.3% | | |
| | | $54.7 \cdot 10^3$ | 99%: $(18 \pm 23) \cdot 10^{-6}$ | 126.9% | | |
| 32 | | $23.2 \cdot 10^3$ | 0%: $(43 \pm 32) \pm 10^{-6}$ | 74.2% | 9.25 | 14.3 |
| | | $37.7 \cdot 10^3$ | 57%: $(27 \pm 18) \cdot 10^{-6}$ | 67.5% | | |
| | | $20.8 \cdot 10^3$ | 99%: $(48 \pm 17) \cdot 10^{-6}$ | 35.4% | | |
| 33 | | $34.0 \cdot 10^3$ | 0%: $(29 \pm 13) \cdot 10^{-6}$ | 45.5% | 9.13 | 13.1 |
| | | $35.9 \cdot 10^3$ | 57%: $(28 \pm 21) \cdot 10^{-6}$ | 73.7% | | |
| | | $36.9 \cdot 10^3$ | 99%: $(27 \pm 15) \cdot 10^{-6}$ | 56.8% | | |
| 34 | | $37.7 \cdot 10^3$ | 0%: $(26.5 \pm 5.9) \cdot 10^{-6}$ | 22.4% | 8.86 | 12.0 |
| | | $40.6 \cdot 10^3$ | 57%: $(25 \pm 18) \cdot 10^{-6}$ | 71.7% | | |
| | | $51.8 \cdot 10^3$ | 99%: $(19 \pm 13) \cdot 10^{-6}$ | 65.7% | | |
| 35 | | $29.5 \cdot 10^3$ | 0%: $(34 \pm 22) \cdot 10^{-6}$ | 64.4% | 9.97 | 12.0 |
| | | $41.9 \cdot 10^3$ | 57%: $(24 \pm 12) \cdot 10^{-6}$ | 48.4% | | |
| | | $27.6 \cdot 10^3$ | 99%: $(36 \pm 16) \cdot 10^{-6}$ | 43.4% | | |
| 36 | | $35.2 \cdot 10^3$ | 0%: $(28 \pm 26) \cdot 10^{-6}$ | 92.2% | 9.50 | 10.8 |
| | | $71.5 \cdot 10^3$ | 57%: $(14.0 \pm 9.9) \cdot 10^{-6}$ | 70.6% | | |
| | | $60.2 \cdot 10^3$ | 99%: $(17 \pm 17) \cdot 10^{-6}$ | 103.6% | | |
| 37 | | $24.9 \cdot 10^3$ | 0%: $(40 \pm 30) \cdot 10^{-6}$ | 75.6% | 9.86 | 10.8 |
| | | $31.0 \cdot 10^3$ | 57%: $(32.2 \pm 4.3) \cdot 10^{-6}$ | 13.4% | | |
| | | $33.1 \cdot 10^3$ | 99%: $(30 \pm 19) \cdot 10^{-6}$ | 62.9% | | |
| 38 | | $16.4 \cdot 10^3$ | 0%: $(61 \pm 25) \cdot 10^{-6}$ | 40.3% | 9.54 | 9.7 |
| | | $23.9 \cdot 10^3$ | 57%: $(42 \pm 25) \cdot 10^{-6}$ | 60.2% | | |
| | | $25.0 \cdot 10^3$ | 99%: $(40 \pm 15) \cdot 10^{-6}$ | 38.0% | | |
| 39 | | $12.9 \cdot 10^3$ | 0%: $(78 \pm 44) \cdot 10^{-6}$ | 57.4% | 9.94 | 9.6 |
| | | $22.1 \cdot 10^3$ | 57%: $(45 \pm 22) \cdot 10^{-6}$ | 47.7% | | |
| | | $25.0 \cdot 10^3$ | 99%: $(40 \pm 25) \cdot 10^{-6}$ | 62.8% | | |
| 40 | | $30.0 \cdot 10^3$ | 0%: $(33 \pm 11) \cdot 10^{-6}$ | 34.1% | 12.32 | 8.29 |
| | | $36.4 \cdot 10^3$ | 57%: $(28 \pm 19) \cdot 10^{-6}$ | 70.2% | | |
| | | $26.8 \cdot 10^3$ | 99%: $(37 \pm 30) \cdot 10^{-6}$ | 80.1% | | |
| 41 | | $17.1 \cdot 10^3$ | 0%: $(58 \pm 33) \cdot 10^{-6}$ | 55.8% | 9.56 | 7.6 |
| | | $29.4 \cdot 10^3$ | 57%: $(34 \pm 22) \cdot 10^{-6}$ | 63.5% | | |
| | | $30.2 \cdot 10^3$ | 99%: $(33 \pm 23) \cdot 10^{-6}$ | 70.0% | | |
| 42 | | $21.5 \cdot 10^3$ | 0%: $(47 \pm 21) \cdot 10^{-6}$ | 45.4% | 8.89 | 8.5 |
| | | $34.3 \cdot 10^3$ | 57%: $(29 \pm 11) \cdot 10^{-6}$ | 36.7% | | |
| | | $11.8 \cdot 10^3$ | 99%: $(85 \pm 146) \cdot 10^{-6}$ | 171.8% | | |

Reference: Spherical Silver—Copper Particles in Silicone

TABLE 7 formula specifications - silicone with spherical metallic additives

| | additive content FOXMET | | Silicone Rhodia RTV 4411 component | | | | Vol-% | |
|---|---|---|---|---|---|---|---|---|
| sample number | mass-% $c_{mA}$ | $m_A$ | $m_{PA}$ | $m_{PS}$ | $c_{mP}$ | HMDS $m_L$ | Foxmet $c_{VA}$ | Silicone $c_{VP}$ |
| 3 | 50% | 5.50 g | 5.000 g | 0.500 g | 50% | — | 10.1% | 89.9% |
| 4 | 70% | 12.83 g | | | 30% | — | 20.7% | 79.3% |
| 5 | 92% | 63.25 g | | | 8% | — | 56.3% | 43.7% |

No electrical conductivity!

Reference: Wacker Elastosil®

TABLE 8 formula specifications - Wacker Elastosil ®

| sample number | type | solvent | production method Manual batch | calender | Additive | Concentration m₁ | m₂ | Furnace Temperature | Time |
|---|---|---|---|---|---|---|---|---|---|
| 1 | LR 3162 | HMDS | 10 minutes | | Carbon black | 25 g | 25 g | 170° C. | 10 minutes |
| 2 | R 573 70A | — | | X | Carbon black | 50 g | 50 g | 150° C. | 12 hours |

TABLE 9 results table - Wacker Elastosil ®

| sample number | Number of sample bodies | electrical properties contact $\rho_D/[\Omega \cdot cm]$ | $\sigma_D/[S/cm]$ | Percentage measurement deviation $\Delta\sigma_D/\sigma_D$ |
|---|---|---|---|---|
| 1 | 3 | ≈8.06 · 10³ | (0.12 ± 0.02) · 10⁻³ | 16.7% |
| 2 | | ≈1.61 · 10³ | (0.62 ± 0.04) · 10⁻³ | 6.5% |

The invention claimed is:

1. A skin overlay for electrodes, sensors, measuring feelers, flexible conductor paths to be arranged on skin of a user, medical devices being in direct contact with skin of a user, elastic bandages, liners, sleeves, ortheses and parts thereof, and prostheses and parts thereof, comprising:
   a conductive polymer material made of
      a base polymer which is an elastomer; and
      conductive solid particles other than carbon black particles distributed in the base polymer, wherein said conductive solid particles are of a micrometer scale and are embedded in the base polymer and distributed substantially homogenously throughout a volume of the base polymer and are not in the form of layers or clusters, wherein said conductive solid particles include one or more of plate-shaped conductive particles having conductively coated plate main bodies formed from an inorganic-oxidic carrier material and which have a width and length of 1 μm to 60 μm and a height of 100 nm to 1 μm,
   wherein said conductive polymer material is configured as a skin overlay having reversible longitudinal resiliency wherein conductivity of the conductive polymer material is maintained up to an elongation of at least 25%.

2. The skin overlay of claim 1 wherein the base polymer is selected from the group consisting of silicone, polyurethane, and rubber.

3. The skin overlay of claim 1 further comprising spherical conductive particles in the base polymer.

4. The skin overlay of claim 3, wherein a weight ratio of the spherical conductive particles to the plate-shaped conductive particles ranges from 10:90 to 90:10.

5. The skin overlay of claim 4 wherein the ratio ranges from 10:90 to 60:40.

6. The skin overlay of claim 3 wherein the spherical conductive particles have a diameter ranging from 500 nm to 25 μm.

7. The skin overlay of claim 1 wherein the conductive solid particles are partially aligned or partially concatenated to form chains.

8. The skin overlay of claim 1 further comprising an intrinsically conductive polymer is contained in said conductive polymer material at a fraction of up to 30 wt. %.

9. The skin overlay of claim 1 wherein said conductive polymer material is configured as a pad or cushion.

10. The skin overlay of claim 1 wherein said conductive polymer material is configured as an electrode for signal acquisition, signal generation, or stimulation.

11. The skin overlay of claim 1 wherein said conductive polymer material is configured as a moisture sensor or stimulus transmission sensor.

12. The skin overlay of claim 1 wherein said elastomer is a thermoplastic elastomer.

13. The skin overlay of claim 1 wherein the base polymer is selected from the group consisting of elastic polyurethane, thermoplastic polyurethane (TPU), polyurethane gel, silicone gel, latex, and synthetic rubber.

14. The skin overlay of claim 1 wherein a volume resistivity of the conductive polymer material is not more than 1000 kΩ·cm measured using a two wire circuit conductivity test.

15. A method for producing a skin overlay for electrodes, sensors, measuring feelers, flexible conductor paths to be arranged on skin of a user, medical devices being in direct contact with skin of a user, elastic bandages, liners, sleeves, ortheses and parts thereof, and prostheses and parts thereof, comprising:
   admixing a base polymer which is an elastomer or precursor of said elastomer with conductive solid particles other than carbon black particles, wherein said conductive solid particles are of a micrometer scale and include one or more of plate-shaped conductive particles having conductively coated plate main bodies formed from an inorganic-oxidic carrier material and which have a width and length of 1 μm to 60 μm and a height of 100 nm to 1 μm;
   aligning the conductive solid particles when said base polymer is either in a dissolved state or in a molten state, or when said precursors are in a process of reaction but are not yet fully reacted; and
   fixing said conductive solid particles in alignment in said base polymer after said aligning step to form a conductive polymer material for use as a skin overlay by solidifying said base polymer, wherein the conductive polymer material has reversible longitudinal resiliency wherein conductivity of the conductive polymer material is maintained up to an elongation of at least 25%.

16. The method as claimed in claim 15, wherein said base polymer is permitted to flow during said aligning step.

17. The method of claim 16 wherein said flow during said aligning step is achieved by one or more of scraping, extrusion or other pressing through a die, and drawing of films.

18. The method of claim 15 wherein said admixing step is performed such that wherein said conductive solid particles are embedded in the base polymer and distributed substantially homogenously throughout a volume of the base polymer and are not in the form of layers or clusters.

19. A method for producing a skin overlay for electrodes, sensors, measuring feelers, flexible conductor paths to be arranged on skin of a user, medical devices being in direct contact with skin of a user, elastic bandages, liners, sleeves, ortheses and parts thereof, and prostheses and parts thereof, comprising:

admixing a base polymer which is an elastomer or precursor of said elastomer with conductive solid particles other than carbon black particles, wherein said conductive solid particles include one or more of plate-shaped conductive particles having conductively coated plate main bodies formed from an inorganic-oxidic carrier material;

aligning the conductive solid particles when said base polymer is either in a dissolved state or in a molten state, or when said precursors are in a process of reaction but are not yet fully reacted; and fixing said conductive solid particles in alignment in said base polymer after said aligning step to form a conductive polymer material for use as a skin overlay by solidifying said base polymer, wherein the conductive polymer material has a reversible longitudinal resiliency wherein conductivity of the conductive polymer material is maintained up to an elongation of at least 25% wherein said base polymer is permitted to flow during said aligning step.

20. The method of claim 19 wherein said admixing step is performed such that wherein said conductive solid particles are embedded in the base polymer and distributed substantially homogenously throughout a volume of the base polymer and are not in the form of layers or clusters.

* * * * *